United States Patent
Amir et al.

(10) Patent No.: US 10,057,418 B1
(45) Date of Patent: Aug. 21, 2018

(54) MANAGING TELEPHONE INTERACTIONS OF A USER AND AN AGENT

(71) Applicant: International Business Machines Corporation, Armonk, NY (US)

(72) Inventors: Arnon Amir, San Jose, CA (US); Nimrod Megiddo, Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/901,112

(22) Filed: Feb. 21, 2018

Related U.S. Application Data (63) Continuation of application No. 15/417,490, filed on Jan. 27, 2017.

(51) Int. Cl.
*H04M 3/428* (2006.01)
*H04M 3/22* (2006.01)
*H04M 7/00* (2006.01)

(52) U.S. Cl.
CPC ....... *H04M 3/4286* (2013.01); *H04M 3/2272* (2013.01); *H04M 7/0012* (2013.01)

(58) Field of Classification Search
CPC .................................................. H04M 3/4286
USPC .................... 379/265.01–266.1, 88.13–88.14
See application file for complete search history.

(56) References Cited

U.S. PATENT DOCUMENTS

| | | | |
|---|---|---|---|
| 4,748,670 A | 5/1988 | Bahl et al. | |
| 5,559,867 A | 9/1996 | Langsenkamp et al. | |
| 6,704,565 B1 | 3/2004 | Parsons et al. | |
| 6,771,746 B2 * | 8/2004 | Shambaugh | H04M 3/493 379/88.13 |
| 7,590,232 B2 | 9/2009 | Carter et al. | |
| 8,526,591 B2 | 9/2013 | Morken et al. | |
| 9,071,947 B1 | 6/2015 | Figa | |
| 9,112,974 B1 | 8/2015 | Wilsie et al. | |
| 9,247,062 B2 | 1/2016 | Fahlgren et al. | |
| 9,288,316 B2 | 3/2016 | Berger et al. | |

(Continued)

OTHER PUBLICATIONS

Unknown, "Hate hold? Maybe Lucy can help." ConsumerReports. org, Consumer Reports Magazine: Nov. 2010, 1 page, http://www.consumerreports.org/cro/magazine-archive/2010/november/electronics-computers/lucyphone/overview/index.htm.

(Continued)

*Primary Examiner* — Md S Elahee
(74) *Attorney, Agent, or Firm* — Peter J. Edwards (57) ABSTRACT

The present invention provides a method, system, and computer program product of managing telephone interactions of a user and an agent. In an embodiment, the present invention includes determining when a user telecommunications device is no longer in an on-hold state based on electronic signals transmitted from an agent telecommunications device, in response to the determining, receiving speech of an agent from the agent telecommunications device, in response to the receiving, transmitting an alert message to the user telecommunications device, in response to the receiving, monitoring for at least one indication that the user is about to speak with the agent, in response to the monitoring not resulting in the at least one indication, transmitting at least one utterance corresponding to the user to the agent telecommunications device, and in response to the monitoring resulting in the at least one indication, conducting a smooth transition to the user.

1 Claim, 8 Drawing Sheets

(56) References Cited

U.S. PATENT DOCUMENTS

| | | |
|---|---|---|
| 9,288,324 B2 | 3/2016 | Montenegro et al. |
| 9,668,112 B2 | 5/2017 | Figa |
| 9,756,187 B2 * | 9/2017 | Chintala ............... H04M 3/568 |
| 2002/0146106 A1 | 10/2002 | Himmel et al. |
| 2006/0217978 A1 | 9/2006 | Mitby et al. |
| 2007/0003045 A1 | 1/2007 | Florkey et al. |
| 2007/0211869 A1 | 9/2007 | Kiiskinen |
| 2008/0181371 A1 | 7/2008 | Merrow et al. |
| 2009/0207996 A1 | 8/2009 | Berger et al. |
| 2016/0021247 A1 | 1/2016 | Marimuthu et al. |

OTHER PUBLICATIONS

Unknown, "FastCustomer," FastCustomer, printed on Oct. 26, 2016, 5 pages, http://www.fastcustomer.com/.

Mell et al., "The NIST Definition of Cloud Computing," Recommendations of the National Institute of Standards and Technology, U.S. Department of Commerce, Special Publication 800-145, Sep. 2011, 7 pages.

Unknown, "Holdr: Do Other Tasks While Waiting on the Line on Hold [iPhone]," MOin, Jan. 29, 2011, last printed Jan. 26, 2017, 3 pages, http://www.makeuseof.com/tag/holdr-being-put-on-hold/.

Amir et al., "Managing Telephone Interactions of a User and an Agent," U.S. Appl. No. 15/417,490, filed Jan. 27, 2017.

List of IBM Patents or Patent Applications Treated as Related, Dated Feb. 20, 2018, 2 pages.

"Accelerated Examination Support Document," International Business Machines Corporation, Dated Feb. 20, 2018, 24 pages.

\* cited by examiner

MANAGING TELEPHONE INTERACTIONS OF A USER AND AN AGENT

BACKGROUND

The present disclosure relates to telephone communication, and more specifically, to managing telephone interactions of a user and an agent.

SUMMARY

The present invention provides a computer implemented method, a system, and a computer program product of managing telephone interactions of a user and an agent. In an exemplary embodiment, the computer implemented method, the system, and the computer program product include (1) determining, by a computer system, when a user telecommunications device is no longer in an on-hold state based on electronic signals transmitted from an agent telecommunications device via a telecommunications channel to the user telecommunications device, (2) in response to the determining, receiving, by the computer system, speech of an agent from the agent telecommunications device via the telecommunications channel, (3) in response to the receiving, transmitting, by the computer system, an alert message to the user telecommunications device to be rendered to a user of the user telecommunications device, where the alert message indicates that the agent is speaking, (4) in response to the receiving, monitoring, by the computer system, the telecommunications channel for at least one indication that the user is about to speak with the agent, (5) in response to the monitoring not resulting in the at least one indication that the user is about to speak with the agent, transmitting, by the computer system, at least one utterance corresponding to the user via the telecommunications channel to the agent telecommunications device, and (6) in response to the monitoring resulting in the at least one indication that the user is about to speak with the agent, conducting, by the computer system, a smooth transition to the user. In a further embodiment, the computer implemented method, the system, and the computer program product further include in response to the receiving, executing, by the computer system, a set of logical operations interpreting the received speech of the agent as a question asked of the user by the agent, where the question includes a request by the agent for information associated with the user, where the at least one utterance includes an answer to the question, where the answer corresponds to the user.

DETAILED DESCRIPTION

The present invention provides a computer implemented method, a system, and a computer program product of managing telephone interactions of a user and an agent. In an exemplary embodiment, the computer implemented method, the system, and the computer program product include (1) determining, by a computer system, when a user telecommunications device is no longer in an on-hold state based on electronic signals transmitted from an agent telecommunications device via a telecommunications channel to the user telecommunications device, (2) in response to the determining, receiving, by the computer system, speech of an agent from the agent telecommunications device via the telecommunications channel, (3) in response to the receiving, transmitting, by the computer system, an alert message to the user telecommunications device to be rendered to a user of the user telecommunications device, where the alert message indicates that the agent is speaking, (4) in response to the receiving, monitoring, by the computer system, the telecommunications channel for at least one indication that the user is about to speak with the agent, (5) in response to the monitoring not resulting in the at least one indication that the user is about to speak with the agent, transmitting, by the computer system, at least one utterance corresponding to the user via the telecommunications channel to the agent telecommunications device, and (6) in response to the monitoring resulting in the at least one indication that the user is about to speak with the agent, conducting, by the computer system, a smooth transition to the user. In a further embodiment, the computer implemented method, the system, and the computer program product further include in response to the receiving, executing, by the computer system, a set of logical operations interpreting the received speech of the agent as a question asked of the user by the agent, where the question includes a request by the agent for information associated with the user, where the at least one utterance includes an answer to the question, where the answer corresponds to the user.

In an embodiment, the question includes a request by the agent for the name of the user. In an embodiment, the question includes a request by the agent for an account number associated with the user. In an embodiment, the at least one indication that the user is about to speak with the agent includes at least one of an off-hook signal and an off mute signal. In an embodiment, the at least one utterance includes a request by the user for information from the agent. For example, the requested information could be what the agent most recently communicated via speech to the user telecommunications device. In another example, the requested information could be the name of the agent. In an embodiment, the at least one utterance includes an utterance spoken by the user and recorded by the computer system. In an embodiment, the at least one utterance includes an utterance generated by the computer system.

In an embodiment, the computer system is a digital telephone (e.g., mobile phone, cell phone, voice-over-IP phone, computer software application implementing a telephone). In an embodiment, the computer system includes a digital telephone. In an embodiment, the computer system includes a computer system of a third-party entity, where the third-party entity is not an entity associated with the agent and where the third-party entity is not an entity associated with the user. In an embodiment, the computer system is a computer system of a third-party entity, where the third-party entity is not an entity associated with the agent and where the third-party entity is not an entity associated with the user. In an embodiment, the user telecommunications device is selected from the group consisting of a digital telephone and an analog telephone.

Definitions

Voice, Speaker Identity, and Text Recognition

Recognition of a human voice, the identity of a speaker, and text spoken by a speaker is feasible with a high level of accuracy by voice recognition technologies/products. Such technologies can turn voice-mail messages, for example, into text without special training for particular speakers. By using such technologies, higher accuracy in such recognition can be achieved with specific training for a speaker. By using such technologies, speaker identification further allows for recognizing the name of a speaker and the identity of the speaker from a database of speakers acquired by a system through training.

Problems with Customer Service Telephone Lines

Many government offices (e.g., the Internal Revenue Service, the Social Security Administration, various courts), other public organizations, utility companies, and businesses provide customer service telephone lines that are functional only during business hours. Many people who work full time may have to make telephone calls to such customer service telephone lines from their work place, on the time of their employers, or on their own time if they are self-employed. Furthermore, holding times on such customer service telephone lines can be very long, and the promises of certain customer service entities to call callers back instead of waiting on-hold may not always be reliable. In many cases, the caller could be forced to listen to repetitive commercial messages and/or closed-loop music. In such cases, the caller would have to stay attentive until an agent got on the line because, once the agent answered, if the customer did not respond immediately, the call could quickly be disconnected. Staying attentive on the line takes away precious time of the caller if he/she is self-employed or precious time of the employer of the caller, resulting in a loss of productivity of at least the caller. The caller could also become irritated if a commercial message or a musical clip were to be repeated many times.

Figure 1A:
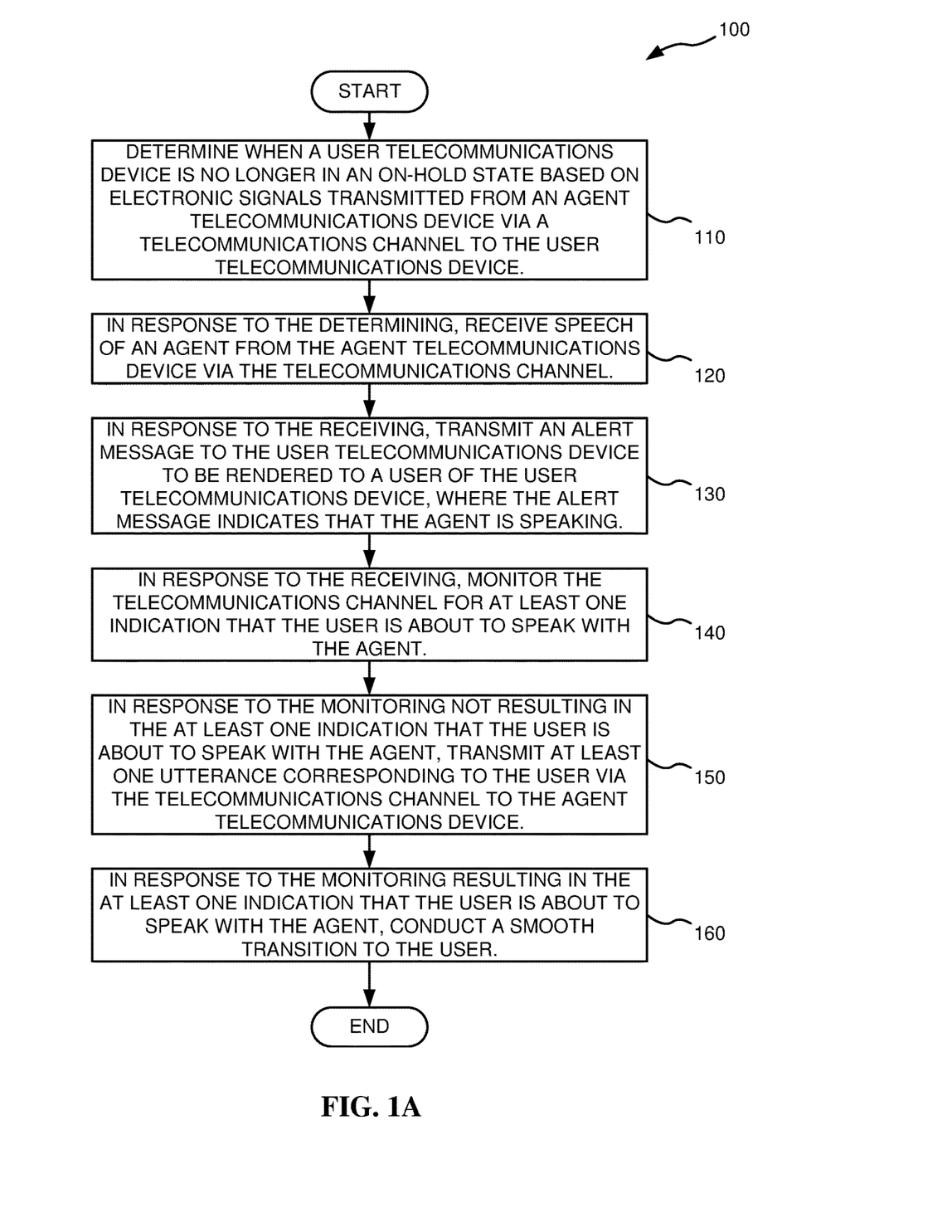
FIG. 1A depicts a flowchart in accordance with an exemplary embodiment of the present invention.
Figure 1B:
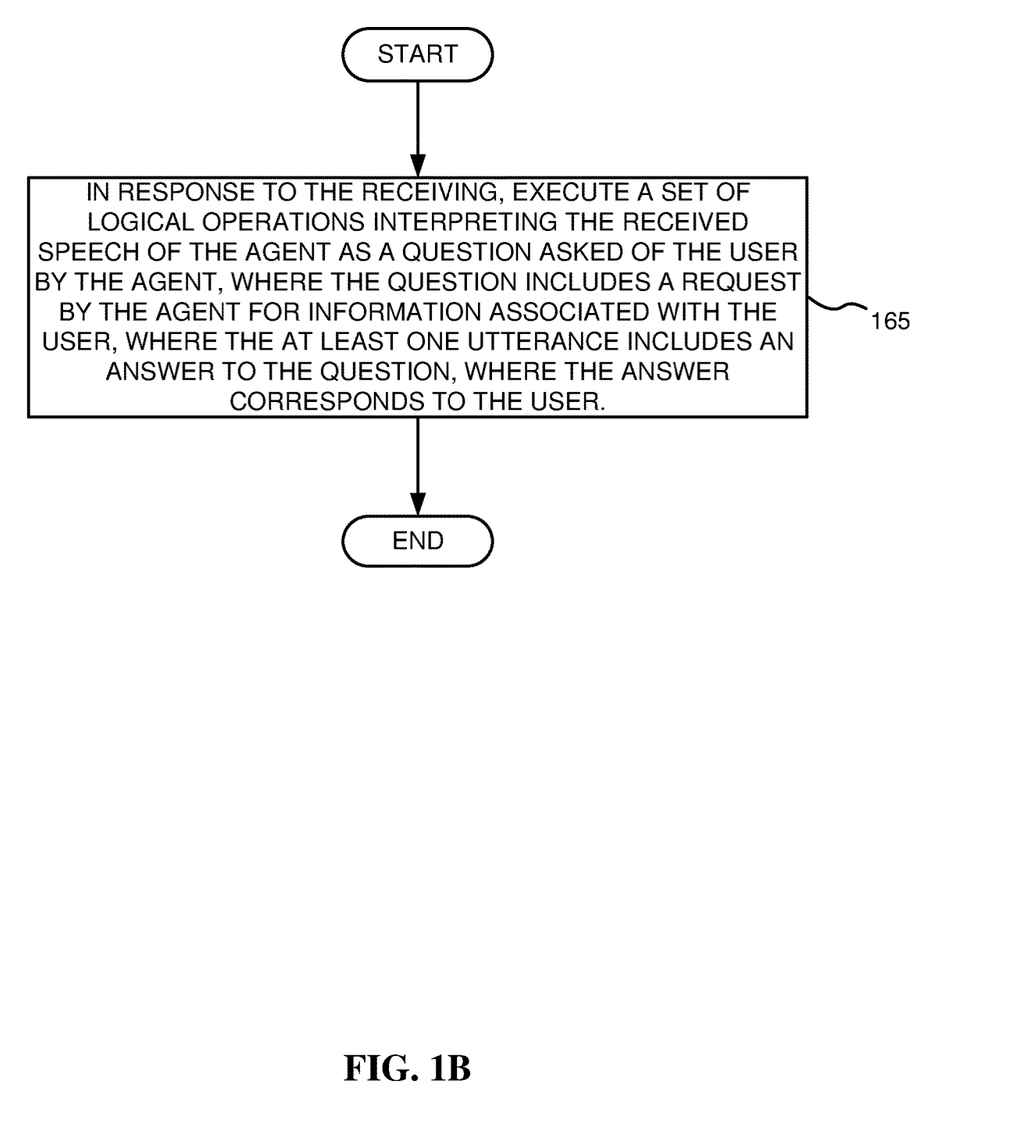
FIG. 1B depicts a flowchart in accordance with an exemplary embodiment of the present invention.

Referring to FIG. 1A, in an exemplary embodiment, the present invention is configured to perform an operation 110 of determining, by a computer system, when a user telecommunications device is no longer in an on-hold state based on electronic signals transmitted from an agent telecommunications device via a telecommunications channel to the user telecommunications device, an operation 120 of in response to the determining, receiving, by the computer system, speech of an agent from the agent telecommunications device via the telecommunications channel, an operation 130 of in response to the receiving, transmitting, by the computer system, an alert message to the user telecommunications device to be rendered to a user of the user telecommunications device, where the alert message indicates that the agent is speaking, (4) an operation 140 of in response to the receiving, monitoring, by the computer system, the telecommunications channel for at least one indication that the user is about to speak with the agent, (5) an operation 150 of in response to the monitoring not resulting in the at least one indication that the user is about to speak with the agent, transmitting, by the computer system, at least one utterance corresponding to the user via the telecommunications channel to the agent telecommunications device, and (6) an operation 160 of in response to the monitoring resulting in the at least one indication that the user is about to speak with the agent, conducting, by the computer system, a smooth transition to the user. Referring to FIG. 1B, in a further embodiment, the present invention is further configured to perform an operation 165 of in response to the receiving, executing, by the computer system, a set of logical operations interpreting the received speech of the agent as a question asked of the user by the agent, where the question includes a request by the agent for information associated with the user, where the at least one utterance includes an answer to the question, where the answer corresponds to the user.

In an embodiment, the question includes a request by the agent for the name of the user. In an embodiment, the question includes a request by the agent for an account number associated with the user. In an embodiment, the at least one indication that the user is about to speak with the agent includes at least one of an off-hook signal and an off mute signal. In an embodiment, the at least one utterance includes a request by the user for information from the agent. For example, the requested information could be what the agent most recently communicated via speech to the user telecommunications device. In another example, the requested information could be the name of the agent. In an embodiment, the at least one utterance includes an utterance spoken by the user and recorded by the computer system. In an embodiment, the at least one utterance includes an utterance generated by the computer system.

In an embodiment, the computer system is a digital telephone. In an embodiment, the computer system includes a digital telephone. In an embodiment, the computer system includes a computer system of a third-party entity, where the third-party entity is not an entity associated with the agent and where the third-party entity is not an entity associated with the user. In an embodiment, the computer system is a computer system of a third-party entity, where the third-party entity is not an entity associated with the agent and where the third-party entity is not an entity associated with the user. In an embodiment, the user telecommunications device is selected from the group consisting of a digital telephone and an analog telephone.

Figure 4:
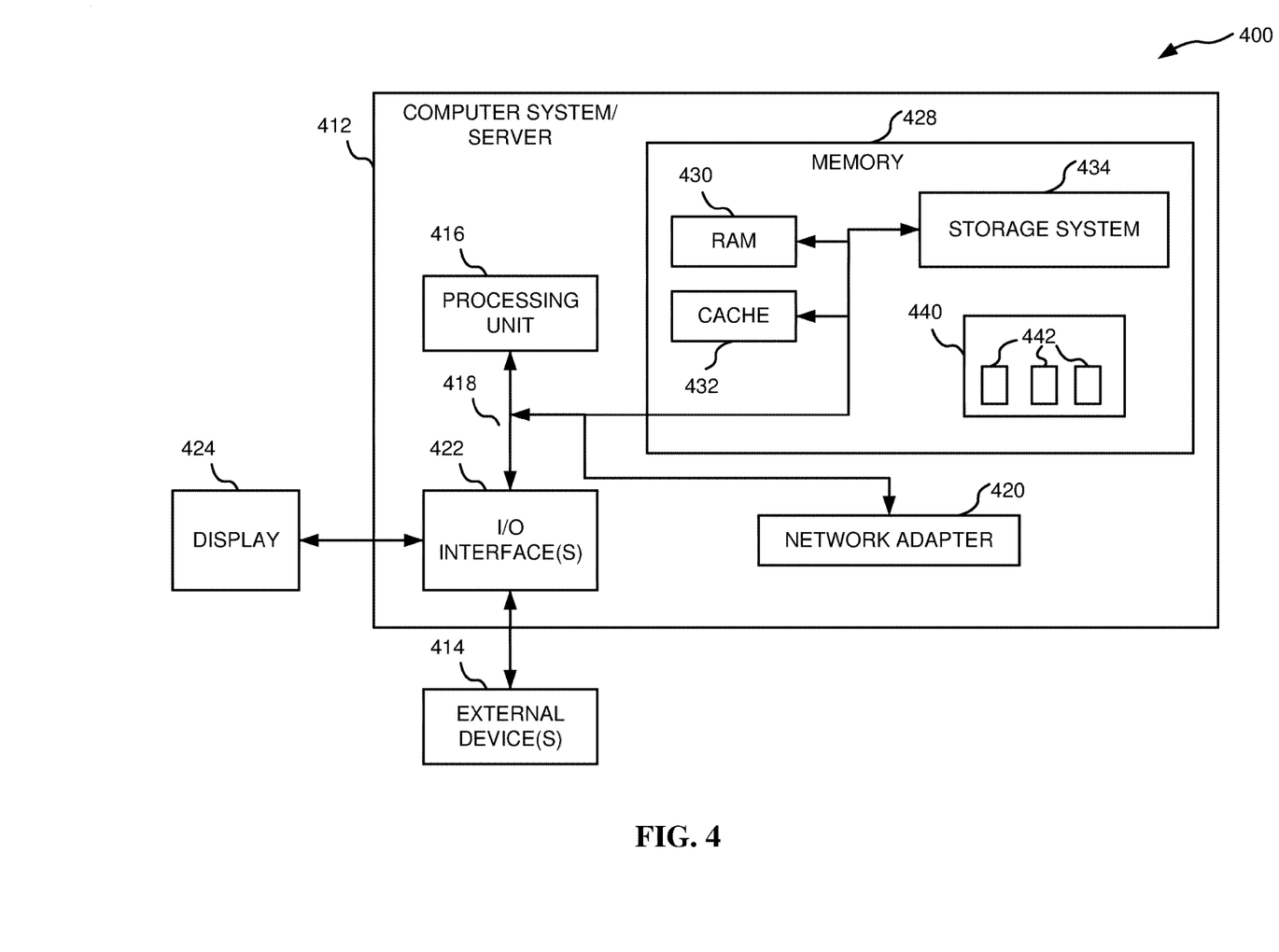
FIG. 4 depicts a computer system in accordance with an exemplary embodiment of the present invention.

In an exemplary embodiment, the computer system is a standalone computer system, such as computer system 400 shown in FIG. 4, a network of distributed computers, where at least some of the computers are computer systems such as computer system 400 shown in FIG. 4, or a cloud computing node server, such as computer system 400 shown in FIG. 4. In an embodiment, the computer system is a computer system 400 as shown in FIG. 4, that executes a managing telephone interactions script or computer software application that carries out the operations of at least method 100. In an embodiment, the computer system is a computer system/server 412 as shown in FIG. 4, that executes a managing telephone interactions script or computer software application that carries out the operations of at least method 100. In an embodiment, the computer system is a computer system 400 as shown in FIG. 4, that executes a managing telephone interactions script or computer software application that carries out at least operations 110, 120, 130, 140, 150, and 160. In an embodiment, the computer system is a computer system 400 as shown in FIG. 4, that executes a managing telephone interactions script or computer software application that carries out at least operation 165. In an embodiment, the computer system is a computer system/sever 412 as shown in FIG. 4, that executes a managing telephone interactions script or computer software application that carries out at least operations 110, 120, 130, 140, 150, and 160. In an embodiment, the computer system is a computer system/sever 412 as shown in FIG. 4, that executes a managing telephone interactions script or computer software application that carries out at least operation 165.

Figure 1C:
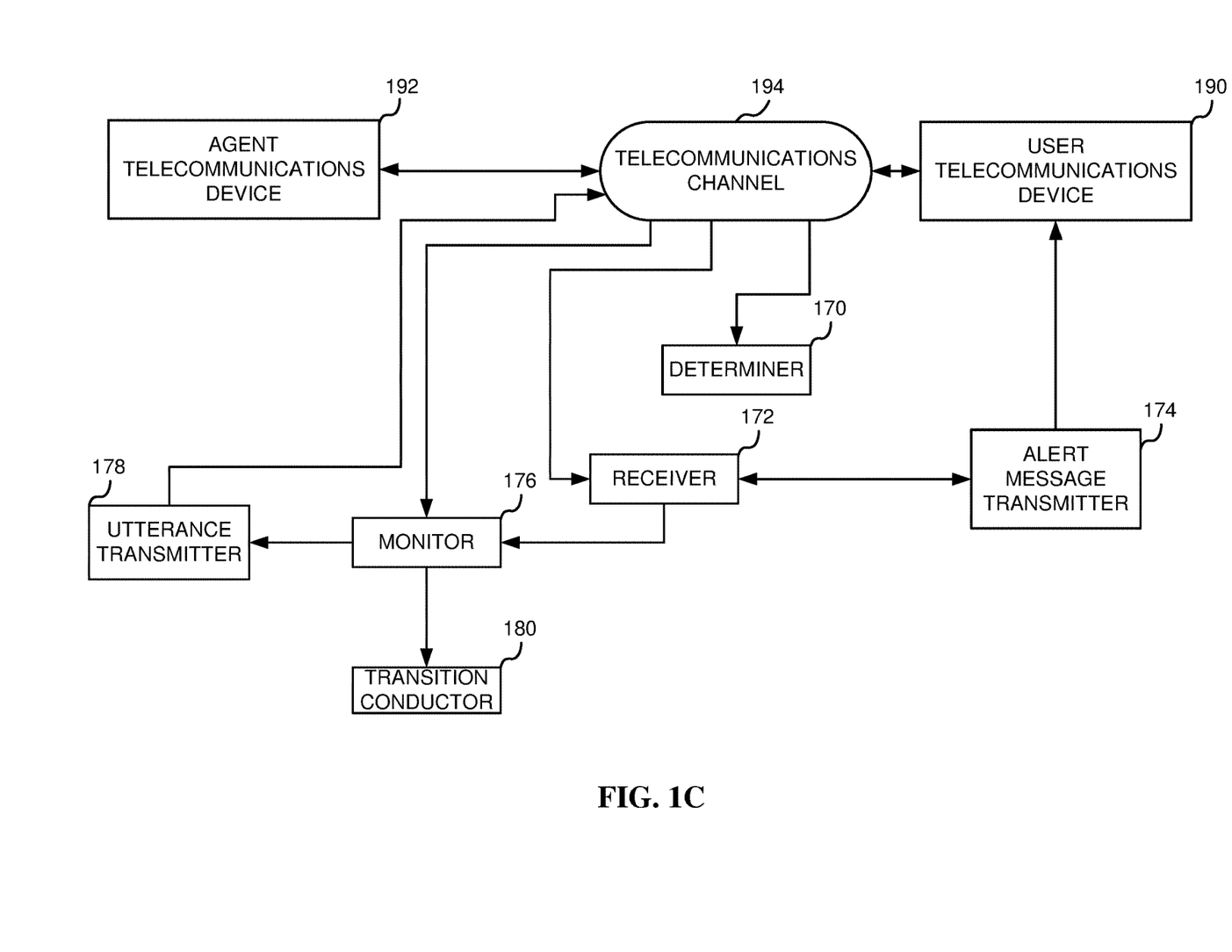
FIG. 1C depicts a block diagram in accordance with an exemplary embodiment of the present invention.

Referring to FIG. 1C, in an exemplary embodiment, the present invention includes a determiner 170, a receiver 172, an alert message transmitter 174, a monitor 176, an utterance transmitter 178, and a transition conductor 180. In an embodiment, determiner 170 is configured to determine when a user telecommunications device 190 is no longer in an on-hold state based on electronic signals transmitted from an agent telecommunications device 192 via a telecommunications channel 194 to a user telecommunications device 190. In an embodiment, determiner 170 includes a computer system, such as computer system 400 as shown in FIG. 4, performing operation 110. In an embodiment, determiner 170 includes a computer system, such as computer system/server 412 as shown in FIG. 4, performing operation 110. In an embodiment, determiner 170 is implemented as computer software executing on a computer system, such as computer system 400 as shown in FIG. 4, such that the computer system performs operation 110. In an embodiment, determiner 170 is implemented as computer software executing on a computer system, such as computer system/server 412 as shown in FIG. 4, such that the computer system performs operation 110. In an embodiment, determiner 170 performs operation 110 as computer software executing on a processor of determiner 170.

In an embodiment, receiver 172 is configured to receive, in response to determining operation 110, speech of an agent from agent telecommunications device 192 via telecommunications channel 194. In an embodiment, receiver 172 includes a computer system, such as computer system 400 as shown in FIG. 4, performing operation 120. In an embodiment, receiver 172 includes a computer system, such as computer system/server 412 as shown in FIG. 4, performing operation 120. In an embodiment, receiver 172 is implemented as computer software executing on a computer system, such as computer system 400 as shown in FIG. 4, such that the computer system performs operation 120. In an embodiment, receiver 172 is implemented as computer software executing on a computer system, such as computer system/server 412 as shown in FIG. 4, such that the computer system performs operation 120. In an embodiment, receiver 172 performs operation 120 as computer software executing on a processor of receiver 172.

In an embodiment, alert message transmitter 174 is configured to transmit, in response to receiving operation 120, an alert message to user telecommunications device 190 to be rendered to a user of user telecommunications device 190, where the alert message indicates that the agent is speaking. In an embodiment, alert message transmitter 174 includes a computer system, such as computer system 400 as shown in FIG. 4, performing operation 130. In an embodiment, alert message transmitter 174 includes a computer system, such as computer system/server 412 as shown in FIG. 4, performing operation 130. In an embodiment, alert message transmitter 174 is implemented as computer software executing on a computer system, such as computer system 400 as shown in FIG. 4, such that the computer system performs operation 130. In an embodiment, alert message transmitter 174 is implemented as computer software executing on a computer system, such as computer system/server 412 as shown in FIG. 4, such that the computer system performs operation 130. In an embodiment, alert message transmitter 174 performs operation 130 as computer software executing on a processor of alert message transmitter 174. In an embodiment, the alert message is rendered as a text message to the user. In an embodiment, the alert message is rendered as an audio message to the user. In an embodiment, the alert message is rendered as a video message to the user.

In an embodiment, monitor 176 is configured to monitor, in response to receiving operation 120, telecommunications channel 194 for at least one indication that the user is about to speak with the agent. In an embodiment, monitor 176 includes a computer system, such as computer system 400 as shown in FIG. 4, performing operation 140. In an embodiment, monitor 176 includes a computer system, such as computer system/server 412 as shown in FIG. 4, performing operation 140. In an embodiment, monitor 176 is implemented as computer software executing on a computer system, such as computer system 400 as shown in FIG. 4, such that the computer system performs operation 140. In an embodiment, monitor 176 is implemented as computer software executing on a computer system, such as computer system/server 412 as shown in FIG. 4, such that the computer system performs operation 140. In an embodiment, monitor 176 performs operation 140 as computer software executing on a processor of monitor 176.

In an embodiment, utterance transmitter 178 is configured to transmit, in response to monitoring operation 140 not resulting in the at least one indication that the user is about to speak with the agent, at least one utterance corresponding to the user via telecommunications channel 194 to agent telecommunications device 192. In an embodiment, utterance transmitter 178 includes a computer system, such as computer system 400 as shown in FIG. 4, performing operation 150. In an embodiment, utterance transmitter 178 includes a computer system, such as computer system/server 412 as shown in FIG. 4, performing operation 150. In an embodiment, utterance transmitter 178 is implemented as computer software executing on a computer system, such as computer system 400 as shown in FIG. 4, such that the computer system performs operation 150. In an embodiment, utterance transmitter 178 is implemented as computer software executing on a computer system, such as computer system/server 412 as shown in FIG. 4, such that the computer system performs operation 150. In an embodiment, utterance transmitter 178 performs operation 150 as computer software executing on a processor of utterance transmitter 178.

In an embodiment, transition conductor 180 is configured to conduct, in response to monitoring operation 140 resulting in the at least one indication that the user is about to speak with the agent, a smooth transition to the user. In an embodiment, transition conductor 180 includes a computer system, such as computer system 400 as shown in FIG. 4, performing operation 160. In an embodiment, transition conductor 180 includes a computer system, such as computer system/server 412 as shown in FIG. 4, performing operation 160. In an embodiment, transition conductor 180 is implemented as computer software executing on a computer system, such as computer system 400 as shown in FIG. 4, such that the computer system performs operation 160. In an embodiment, transition conductor 180 is implemented as computer software executing on a computer system, such as computer system/server 412 as shown in FIG. 4, such that the computer system performs operation 160. In an embodiment, transition conductor 180 performs operation 160 as computer software executing on a processor of transition conductor 180.

In a further embodiment, the present invention includes an executor. In an embodiment, the executor is configured to execute, in response to receiving operation 120, a set of logical operations interpreting the received speech of the agent as a question asked of the user by the agent, where the question includes a request by the agent for information associated with the user, where the at least one utterance includes an answer to the question, where the answer corresponds to the user. In an embodiment, the executor includes a computer system, such as computer system 400 as shown in FIG. 4, performing operation 165. In an embodiment, the executor includes a computer system, such as computer system/server 412 as shown in FIG. 4, performing operation 165. In an embodiment, the executor is implemented as computer software executing on a computer system, such as computer system 400 as shown in FIG. 4, such that the computer system performs operation 165. In an embodiment, the executor is implemented as computer software executing on a computer system, such as computer system/server 412 as shown in FIG. 4, such that the computer system performs operation 165. In an embodiment, the executor performs operation 165 as computer software executing on a processor of the executor.

Determining End of On-Hold State

In an exemplary embodiment, the determining includes comparing, by the computer system, the electronic signals with data stored in a computer database, where the data indicates on-hold characteristics of entities who may be represented by the agent. In an embodiment, determining operation 110 includes comparing, by the computer system, the electronic signals with data stored in a computer database, where the data indicates on-hold characteristics of entities who may be represented by the agent. In an embodiment, determiner 170 is configured to compare the electronic signals with data stored in a computer database, where the data indicates on-hold characteristics of entities who may be represented by the agent. In an embodiment, determiner 170 includes a computer system, such as computer system 400 as shown in FIG. 4, comparing the electronic signals with data stored in a computer database, where the data indicates on-hold characteristics of entities who may be represented by the agent. In an embodiment, determiner 170 includes a computer system, such as computer system/server 412 as shown in FIG. 4, comparing the electronic signals with data stored in a computer database, where the data indicates on-hold characteristics of entities who may be represented by the agent. In an embodiment, determiner 170 is implemented as computer software executing on a computer system, such as computer system 400 as shown in FIG. 4, such that the computer system compares the electronic signals with data stored in a computer database, where the data indicates on-hold characteristics of entities who may be represented by the agent. In an embodiment, determiner 170 is implemented as computer software executing on a computer system, such as computer system/server 412 as shown in FIG. 4, such that the computer system compares the electronic signals with data stored in a computer database, where the data indicates on-hold characteristics of entities who may be represented by the agent. In an embodiment, determiner 170 compares the electronic signals with data stored in a computer database, where the data indicates on-hold characteristics of entities who may be represented by the agent as computer software executing on a processor of determiner 170.

In an embodiment, the on-hold characteristics of the entities who may be represented by the agent include at least one of particular music associated with on-hold states associated with the entities, particular audible tones associated with on-hold states associated with the entities, and particular utterances associated with on-hold states associated with the entities. For example, an entity (e.g., company) may play a particular jingle/music to be heard by a user/customer calling the entity while the entity has the user/customer on-hold. As another example, an entity (e.g., company) may play a particular audible tone/tones to be heard by a user/customer calling the entity while the entity has the user/customer on-hold. Also, for example, an entity (e.g., company) may play particular utterances to be heard by a user/customer calling the entity while the entity has the user/customer on-hold. Particularly, an electric power company may play utterances discussing its delivery of electricity in a certain way.

Conducting Smooth Transition

In an exemplary embodiment, the conducting a smooth transition to the user includes transmitting, by the computer system, via the telecommunications channel to the agent telecommunications device, utterances that at least introduce the user to the agent. In an embodiment, conducting operation 160 includes transmitting, by the computer system, via the telecommunications channel to the agent telecommunications device, utterances that at least introduce the user to the agent. In an embodiment, transition conductor 180 is configured to transmit via telecommunications channel 194 to agent telecommunications device 192, utterances that at least introduce the user to the agent. In an embodiment, transition conductor 180 includes a computer system, such as computer system 400 as shown in FIG. 4, transmitting via telecommunications channel 194 to agent telecommunications device 192, utterances that at least introduce the user to the agent. In an embodiment, transition conductor 180 includes a computer system, such as computer system/server 412 as shown in FIG. 4, transmitting via telecommunications channel 194 to agent telecommunications device 192, utterances that at least introduce the user to the agent. In an embodiment, transition conductor 180 is implemented as computer software executing on a computer system, such as computer system 400 as shown in FIG. 4, such that the computer system transmits via telecommunications channel 194 to agent telecommunications device 192, utterances that at least introduce the user to the agent. In an embodiment, transition conductor 180 is implemented as computer software executing on a computer system, such as computer system/server 412 as shown in FIG. 4, such that the computer system transmits via telecommunications channel 194 to agent telecommunications device 192, utterances that at least introduce the user to the agent. In an embodiment, transition conductor 180 transmits via telecommunications channel 194 to agent telecommunications device 192, utterances that at least introduce the user to the agent as computer software executing on a processor of transition conductor 180.

In an embodiment, the utterances transmitted during the smooth transition include at least one phrase thanking the agent. For example, the present invention could transmit "Thank you AGENT NAME" to the agent telecommunications device, where "AGENT NAME" is the spoken name of the agent. In an embodiment, the utterances transmitted during the smooth transition include at least one phrase asking the agent to wait. For example, the present invention could transmit "Please wait a moment" to the agent telecommunications device. In an embodiment, the utterances transmitted during the smooth transition include at least one phrase introducing the user. For example, the present invention could transmit "USER NAME is now joining the call"

to the agent telecommunications device, where "USER NAME" is the spoken name of the user.

Learning On-Hold Model of Customer/User/Caller

Figure 2:
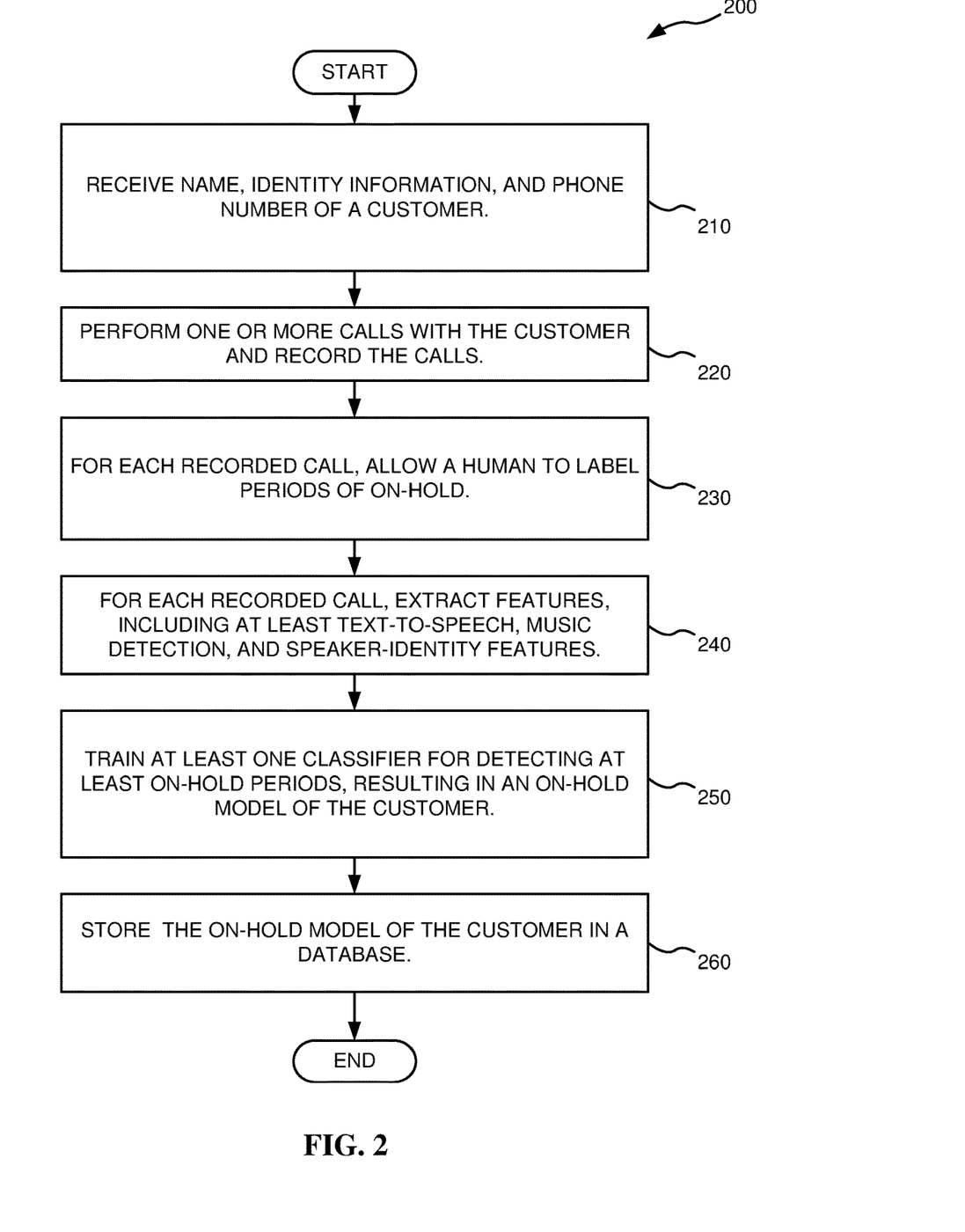
FIG. 2 depicts a flowchart in accordance with an embodiment of the present invention.

In an embodiment, by making use of data acquired by voice, speaker identity, and text recognition technologies, the present invention is trained for specific often-called service centers (e.g., IRS, Social Security Administration, U.S. Citizenship & Immigration Services, etc.). The specific training could be based on multiple calls and hold periods from a customer-service provider, where the calls and the hold periods are recorded and labeled as "hold" and "agent", accordingly. In an embodiment, the present invention is then trained to classify an audio signal transmitted on telecommunications channel 194 to one of class of a set of classes (e.g., "hold" and "agent") by combining both textual content and speaker identity tags. For example, FIG. 2 depicts a training process of an embodiment of the present invention to learn a customer/user/caller on-hold model for a customer/user/caller. The training could be done by a company that develops and deploys the present invention, by a customer/user/caller (e.g., marking on a cell phone of the customer/user/caller each time the customer/user/caller is put on hold, then tap again when the on-hold period ends such that the cell phone learns the customer/user/caller and utilizes such learning in future calls), or by a third party that could generate databases of various customers (e.g., national, regional and vertical domains (transportation, communication, government, etc.)) and that could license such databases to customers/users/callers of the present invention.

Recognition of Customer/User/Caller and Recognition of Agent

Figure 3:
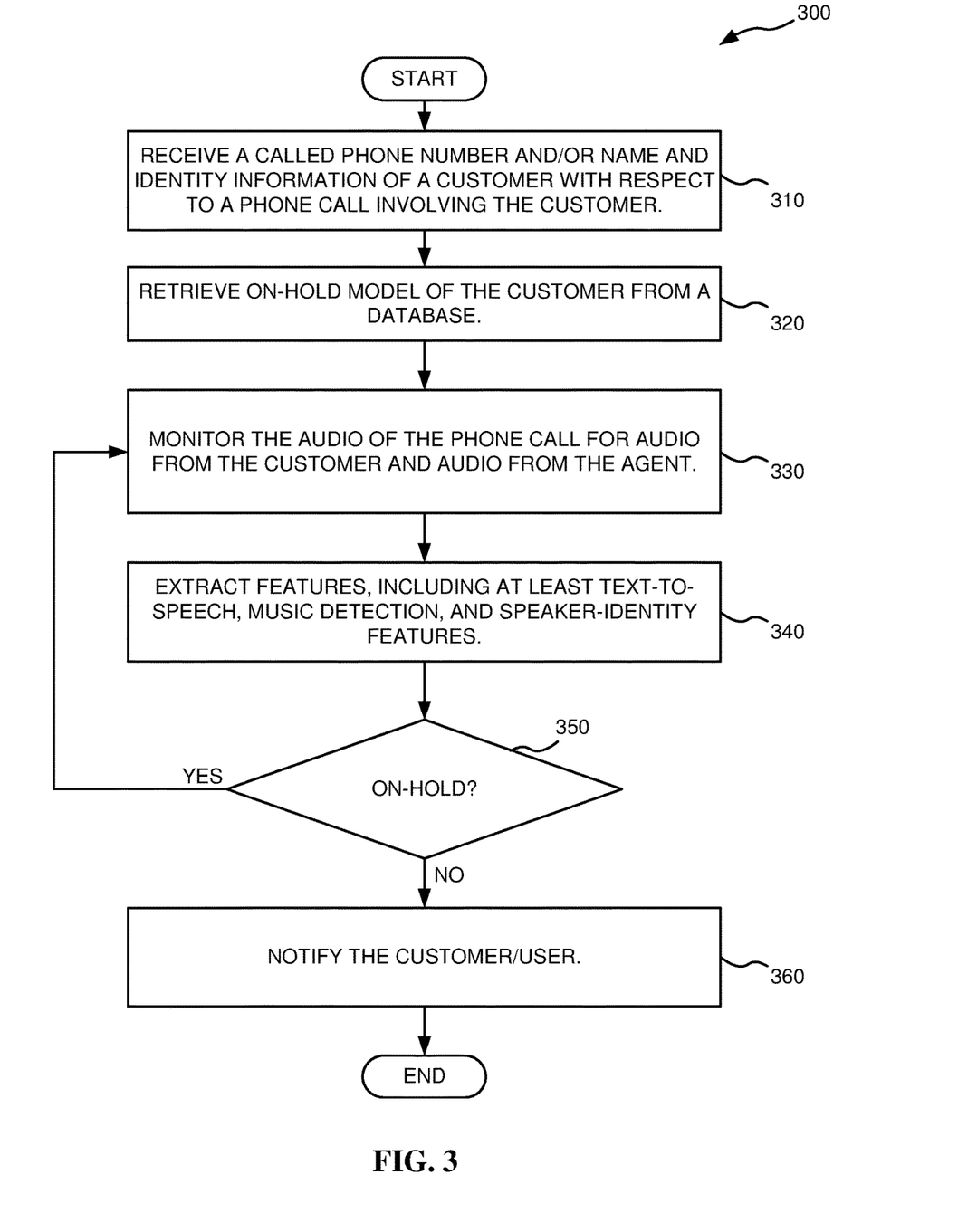
FIG. 3 depicts a flowchart in accordance with an embodiment of the present invention.

In an embodiment, during a phone call, the present invention uses the on-hold model that the present invention learned for the particular phone number/customer name/customer identity/service center associated with a phone call. The present invention could employ various methods for detecting precisely when a live agent starts talking on a phone line/telecommunications channel 194. In an embodiment, the present invention monitors the phone line/telecommunications channel 194 and recognizes continuously whether music is being played, a voice is uttering some text, or the line silent. As long as music is being played, in an embodiment, the present invention assumes that no live agent is speaking and replaces the audio content by another audio content that is customized for the preferences of the customer/user, which could be set in advance. If the phone line/telecommunications channel 194 is silent, in an embodiment, the present invention applies a pre-set time limit for silence, after which the present invention disconnects the phone line/telecommunications channel 194. In an embodiment, if the present invention recognizes that there is a voice speaking on the phone line/telecommunications channel 194, the present invention enters a mode of on-hold speech & speaker recognition, where the present invention attempts to generate text that matches the speech, employing techniques of speech recognition and Natural Language Processing (NLP), of speaker identification (where the present invention would have learned to recognize the on-hold "person"). For example, FIG. 3 depicts how the present invention, in an embodiment, detects the end of an on-hold period.

In an embodiment, the present invention distinguishes a live agent from recorded speech on a customer-service telephone line/telecommunications channel 194 by recognizing particular phrases/utterances. For example, the present invention could execute a classification process or make such distinctions based on such phrases. For example, the present invention could recognize a recorded message on a customer-service telephone line/telecommunications channel 194 if the present invention detects at least one of the following phrases/utterances: "please press", "our menu", "momentarily", "continue to hold", "wait time", "your wait time", "please remain", "please remain on the line", "due to", "due to high", "there are N callers" where "N" is a spoken number, "call is important", "double-u double-u double-u".

For example, the present invention could recognize a live agent on a customer-service telephone line/telecommunications channel 194 if the present invention detects at least one of the following phrases/utterances: "This is NAME on a recorded line" where "NAME" is the spoken name of a person, "How are you?", "How are you doing?", "How are you doing today?", "How may I help you?", "Whom am I speaking?", "Whom am I speaking to?", "What is your name?", "I apologize" (as opposed to "we apologize"). In an embodiment, when the present invention is customized for a particular customer/user/site, the present invention initially collects a large number of phrases/utterance from experience with the particular site. In an embodiment, when the present invention recognizes one of the phrases/utterances that indicate a live agent speaking on the customer-service telephone line/telecommunications channel 194, the present invention transfers the call to the customer.

Interactions with Agent and User

In an embodiment, the present invention automatically detects a human agent/live agent and reconnects a caller/user/customer with the human agent with neither the continuous attention of the caller/user/customer being required nor the cooperation of the human agent being required. In an embodiment, when the present invention decides to transfer a telephone call to the customer/user/caller, the present invention monitors the telephone line/telecommunications channel 194 to see whether the customer said something, and if not, the present invention attempts to conduct a brief conversation with the human agent to allow more time for the customer to reach the telephone. In an embodiment, the present invention conducts the brief conversation by asking the agent to repeat what the agent said (e.g., "I'm sorry, can you please repeat that" or "Can you please tell me your name?"). In an embodiment, the present invention pre-records an opening sentence spoken by the customer, which the present invention may start playing when the live agent gets on the telephone line/telecommunications channel 194. For example, the present invention could ask the customer prior to placing the call a question (e.g., "Please explain the purpose of your call as if you were talking to a live agent"), and then could record the customer saying an answer to such question (e.g., "I am calling to find out why I received a letter"). The present invention could then play the recorded answer after the live agent has gotten on the telephone line/telecommunications channel 194. In an embodiment, while allowing the user/customer time to reconnect to the live agent, the present invention responds on behalf of the user to simple questions asked by the agent (e.g., "What is your name", "what is your account number"), if such information had been made available to the present invention beforehand by the user/customer (e.g., put in database associated with the user/customer or in a contacts list of the user/customer).

Example

The present invention could transform the setting where a caller waits, being attentive, listening to unwanted audio contents, not being able to perform required work for his or her job, into a setting where the caller can continue to be productive as required for his or her job and does not feel annoyed. For example, the present invention could be implemented as a mobile-device application on a mobile phone. In another example, the present invention could be implemented as a physical device attached to a traditional telephone set. In an embodiment, the present invention understands the audio content played by the owner of a telephone line being called while the caller is waiting, and recognizes when a human agent has started talking on the telephone call. In an embodiment, prior to that moment, the present invention replaces the audio content played by the owner of the telephone line with audio content preferred by the caller. In an embodiment, the present invention engages in a brief conversation with the human agent until the human caller takes over.

Revenue Generation

In an embodiment, the present invention provides a service that implements at least the operations depicted in FIG. 1A, FIG. 1B, FIG. 2, and FIG. 3 using the system depicted in FIG. 1C. For example, a potential client of such a service could be a corporation/company/entity with employees who could make telephone phone calls while they work and could, using the present invention, continue to hold the telephone line without a significant effect on their productivity. The corporation/company/entity could deploy the present invention on all of its business telephone lines. With such a deployment, the present invention could save the time of an employee by freeing the employee from waiting on-hold when making a telephone call, thereby allowing the employee to perform other work tasks.

In an embodiment, the present invention provides a service offered by a cell-phone provider. For example, a cell-phone provider could offer the service as a premium service, as part of a premium package, or as a business package, provided to subscribers via a monthly fee or a per-use fee. Once activated for the line, the user could use the service by pressing a key, or a software application/app on the cell-phone. In an embodiment, the present invention is run on a telecommunications and/or computer system infrastructure of a cell-phone provider and analyzes "on-hold" audio received from the called party, and does not pass the phone call to the telephone of the caller as long as the caller is on-hold, thereby saving cell bandwidth in addition to freeing the caller for the on-hold period.

In an embodiment, the present invention provides a pay-per-use service where the present invention charges a corporation/company/entity/employer that wants to save holding time for employees of a corporation/company/entity/employer who need to make some telephone calls during work hour. The present invention could charge a fee associated with the time that the caller was waiting on-hold on a per-case or per-minute basis, resulting in time saved by the user/employee/caller. In an embodiment, the present invention is a pay-per-app download.

In an embodiment, the present invention provides an addition to a cell-phone service such that if a user does not listen to a telephone line while on-hold, the present invention determines that there is no need to continuously transmit audio from the cell network to the cell-phone device. Thus, the present invention could temporarily disconnect the telephone call, and then the present invention could resume the telephone call connection when the agent is detected, thereby saving the cell-phone service provider power and bandwidth and saving battery power on the cell-phone of the customer/caller/user.

Computer System

In an exemplary embodiment, the computer system is a computer system 400 as shown in FIG. 4. Computer system 400 is only one example of a computer system and is not intended to suggest any limitation as to the scope of use or functionality of embodiments of the present invention. Regardless, computer system 400 is capable of being implemented to perform and/or performing any of the functionality/operations of the present invention.

Computer system 400 includes a computer system/server 412, which is operational with numerous other general purpose or special purpose computing system environments or configurations. Examples of well-known computing systems, environments, and/or configurations that may be suitable for use with computer system/server 412 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices.

Computer system/server 412 may be described in the general context of computer system-executable instructions, such as program modules, being executed by a computer system. Generally, program modules may include routines, programs, objects, components, logic, and/or data structures that perform particular tasks or implement particular abstract data types. Computer system/server 412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 412 in computer system 400 is shown in the form of a general-purpose computing device. The components of computer system/server 412 may include, but are not limited to, one or more processors or processing units 416, a system memory 428, and a bus 418 that couples various system components including system memory 428 to processor 416.

Bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 412 typically includes a variety of computer system readable media. Such media may be any available media that is accessible by computer system/server 412, and includes both volatile and non-volatile media, removable and non-removable media.

System memory 428 can include computer system readable media in the form of volatile memory, such as random access memory (RAM) 430 and/or cache memory 432. Computer system/server 412 may further include other removable/non-removable, volatile/non-volatile computer system storage media. By way of example only, storage system 434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 418 by one or more data media interfaces. As will be further depicted and described below, memory 428 may include at least one program product having a set (e.g., at least one) of program modules that are configured to carry out the functions/operations of embodiments of the invention.

Program/utility 440, having a set (at least one) of program modules 442, may be stored in memory 428 by way of example, and not limitation. Exemplary program modules 442 may include an operating system, one or more application programs, other program modules, and program data. Each of the operating system, one or more application programs, other program modules, and program data or some combination thereof, may include an implementation of a networking environment. Program modules 442 generally carry out the functions and/or methodologies of embodiments of the present invention.

Computer system/server 412 may also communicate with one or more external devices 414 such as a keyboard, a pointing device, a display 424, one or more devices that enable a user to interact with computer system/server 412, and/or any devices (e.g., network card, modem, etc.) that enable computer system/server 412 to communicate with one or more other computing devices. Such communication can occur via Input/Output (I/O) interfaces 422. Still yet, computer system/server 412 can communicate with one or more networks such as a local area network (LAN), a general wide area network (WAN), and/or a public network (e.g., the Internet) via network adapter 420. As depicted, network adapter 420 communicates with the other components of computer system/server 412 via bus 418. It should be understood that although not shown, other hardware and/or software components could be used in conjunction with computer system/server 412. Examples, include, but are not limited to: microcode, device drivers, redundant processing units, external disk drive arrays, RAID systems, tape drives, and data archival storage systems.

Cloud Computing

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
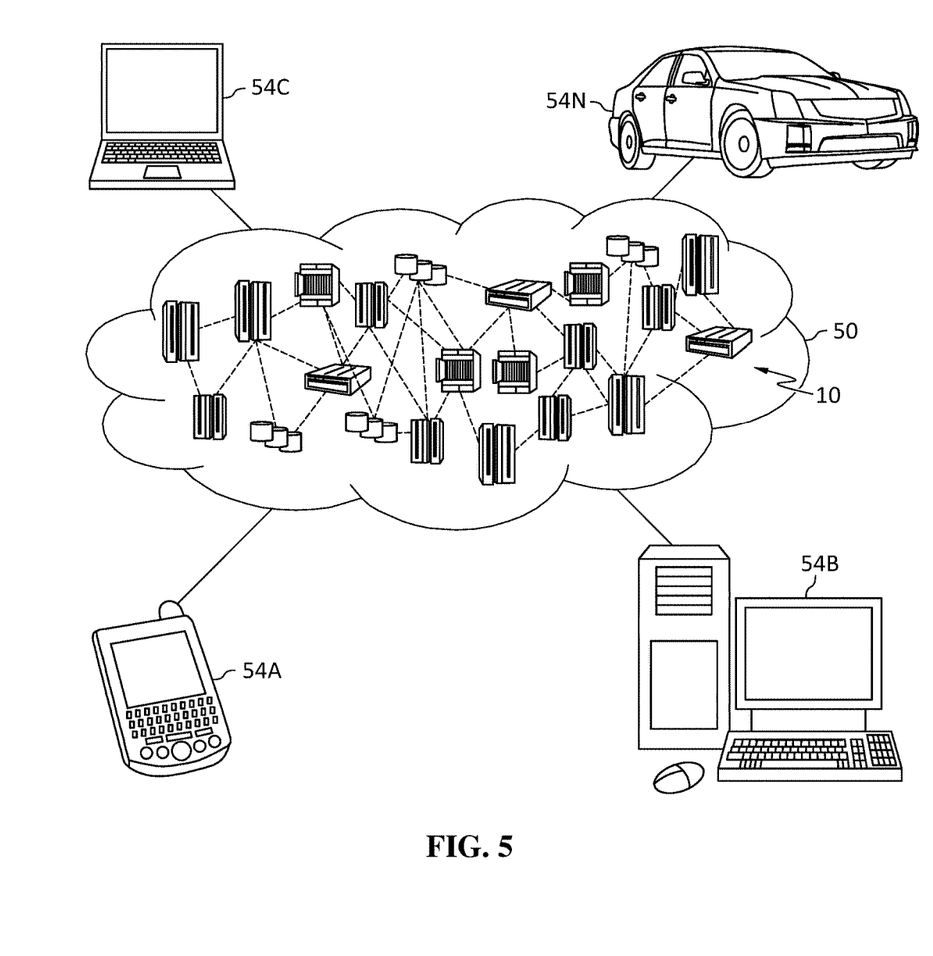
FIG. 5 depicts a cloud computing environment according to various embodiments of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
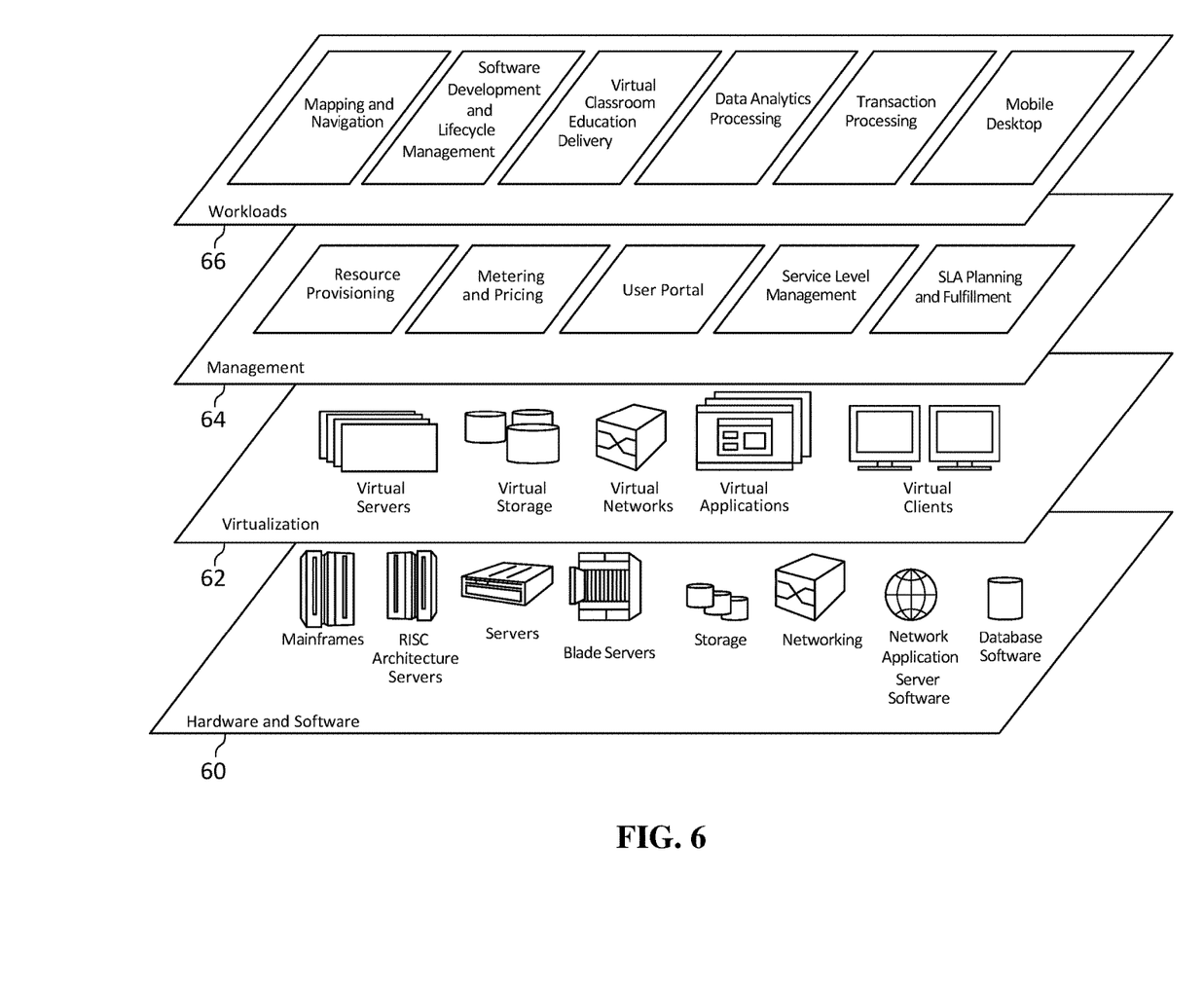
FIG. 6 depicts abstraction model layers according to various embodiments of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes; RISC (Reduced Instruction Set Computer) architecture based servers; storage devices; networks and networking components. In some embodiments, software components include network application server software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

Computer Program Product

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer implemented method comprising:
   determining, by a computer system, when a user telecommunications device is no longer in an on-hold state based on electronic signals transmitted from an agent telecommunications device via a telecommunications channel to the user telecommunications device,
   wherein the determining comprises comparing, by the computer system, the electronic signals with data stored in a computer database, wherein the data indicates on-hold characteristics of entities who may be represented by the agent;
   in response to the determining, receiving, by the computer system, speech of an agent from the agent telecommunications device via the telecommunications channel;
   in response to the receiving, transmitting, by the computer system, an alert message to the user telecommunications device to be rendered to a user of the user telecommunications device,
   wherein the alert message indicates that the agent is speaking;
   in response to the receiving, monitoring, by the computer system, the telecommunications channel for at least one indication that the user is about to speak with the agent,
   wherein the at least one indication that the user is about to speak with the agent comprises at least one of an off-hook signal and an off mute signal;
   in response to the monitoring not resulting in the at least one indication that the user is about to speak with the agent, transmitting, by the computer system, at least one utterance corresponding to the user via the telecommunications channel to the agent telecommunications device,
   wherein the at least one utterance comprises a request by the user for information from the agent;
   in response to the monitoring resulting in the at least one indication that the user is about to speak with the agent, conducting, by the computer system, a smooth transition to the user, wherein the conducting a smooth transition to the user comprises transmitting, by the computer system, via the telecommunications channel to the agent telecommunications device, utterances that at least introduce the user to the agent;
   in response to the receiving, executing, by the computer system, a set of logical operations interpreting the received speech of the agent as a question asked of the user by the agent,
   wherein the question comprises a request by the agent for information associated with the user, and wherein the at least one utterance comprises an answer to the question, wherein the answer corresponds to the user; and wherein the user telecommunications device is selected from the group consisting of a digital telephone and an analog telephone.

* * * * *